United States Patent [19]

Spencer

[11] Patent Number: 5,475,391
[45] Date of Patent: Dec. 12, 1995

[54] RADAR RECEIVER

[75] Inventor: George R. Spencer, Bedford, N.H.

[73] Assignee: Raytheon Company, Lexington, Mass.

[21] Appl. No.: 947,571

[22] Filed: Dec. 24, 1986

[51] Int. Cl.⁶ .................................................. G01S 13/00
[52] U.S. Cl. ............................................................. 342/62
[58] Field of Search ............................. 342/62, 89, 100, 342/199; 244/3.14, 3.19

[56]  References Cited

U.S. PATENT DOCUMENTS 3,631,485  12/1971  Beazell, Jr. .......................... 342/62 X
3,938,148  2/1976  Hobson ................................. 342/62 X
4,100,545  7/1978  Tabourier .............................. 342/62
4,216,472  8/1980  Albanese .............................. 342/62 X
4,256,275  3/1981  Flick et al. ............................ 342/62 X Primary Examiner—Mark Hellner
Attorney, Agent, or Firm—Donald F. Mofford; William R. Clark

[57]  ABSTRACT

A narrow band receiver is shown to include a double downconversion arrangement wherein the frequency of the second local oscillator is controlled to maintain the frequency of the second I.F. signals at a predetermined value.

4 Claims, 3 Drawing Sheets 5,475,391

RADAR RECEIVER

BACKGROUND OF THE INVENTION

This invention pertains generally to radar receivers used in semiactive guidance systems, and particularly to an improved narrow band rear receiver for use in such systems.

As is known in the art, a rear radar receiver, the primary function of which is to provide a coherent reference signal (usually at an X-band frequency) for Doppler processing of target return signals in a front radar receiver, is usually incorporated in a semiactive guidance system in a guided missile. To this end, the rear radar receiver is adapted to search for, acquire and track the signal transmitted from an illuminator, thereby to allow generation of a reference signal (offset from the X-band illuminator signal by the first intermediate frequency) for use as the first local oscillator signal of the front radar receiver. In order to maintain the spectral purity of the reference signal in the presence of plume noise, multi-path effects and low rear receiver signal-to-noise ratio so that the subclutter visibility of the front radar receiver may be preserved a narrow band automatic phase control (APC) tracking loop is provided so that the frequency of the rear radar receiver may be locked to the frequency of the illuminator signal, It has been found to be advantageous to use a so-called YIG filter in the tracking loop. As is known, such a filter is electronically tunable so that compensation may be quickly made for any change in frequency of the illuminator signal as received by the rear receiver. It has been found, however, that in operation, any known YIG filter is very susceptible to vibration and changes in the strength of the required magnetic field. Further, all known YIG filters and the associated drive circuits are relatively expensive.

SUMMARY OF THE INVENTION

With the foregoing background of the invention in mind, it is a primary object of this invention to provide a narrow band rear radar receiver for a semiactive guidance system, such receiver being made up of standard elements, not including a YIG filter.

The primary and other objects of this invention are generally attained by providing, in a semiactive guidance system, front and rear radar receivers, each arranged for double downconversion of radio frequency signals to first and second intermediate frequency (I.F.) signals, with an AFC loop operating to control the frequency of the second local oscillator, such AFC loop being fabricated of standard elements, not including a YIG filter.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT

Figure 1A:
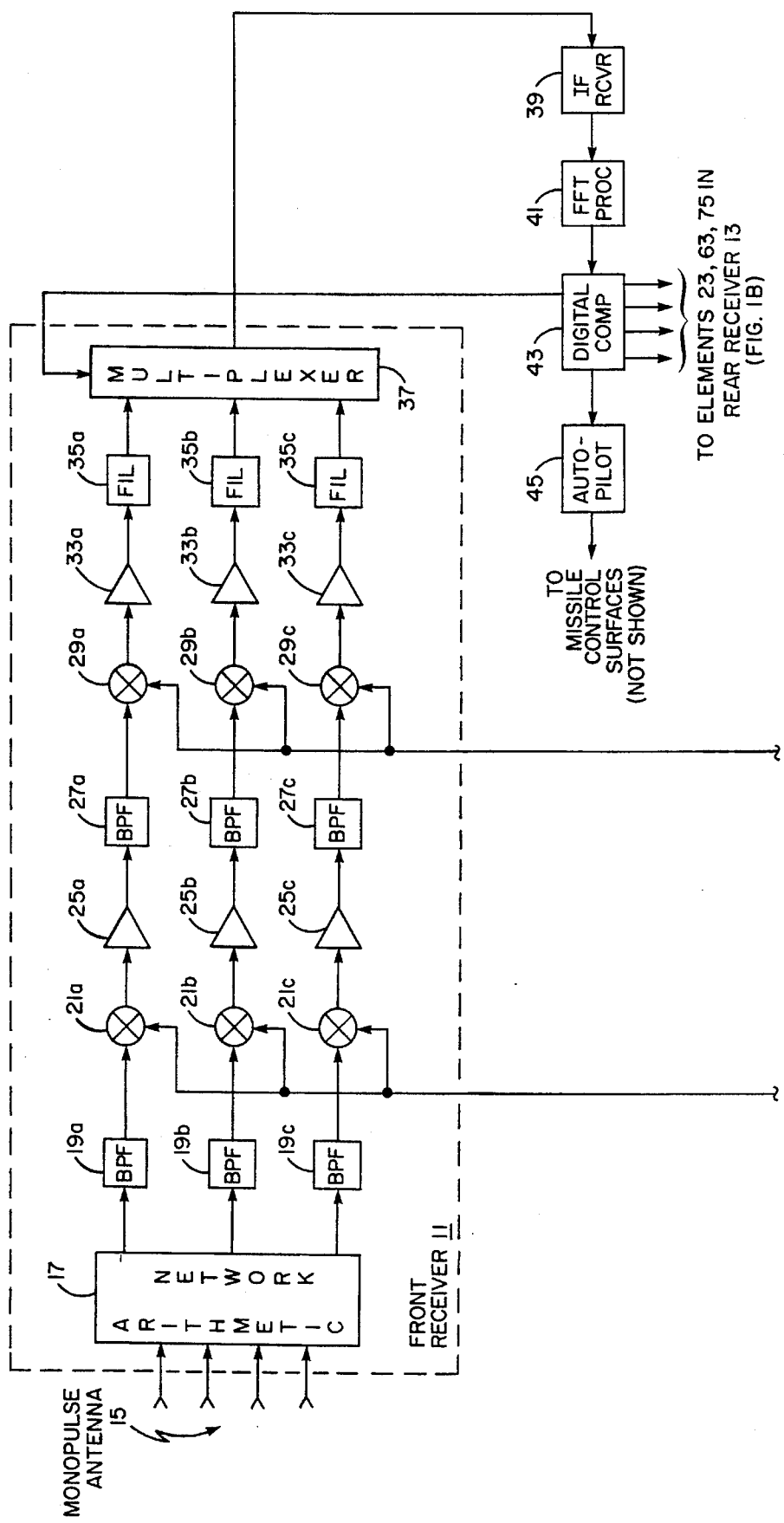
FIGS. 1A and 1B, taken together, constitute a simplified block diagram of a semiactive guidance system according to this invention.
Figure 1B:
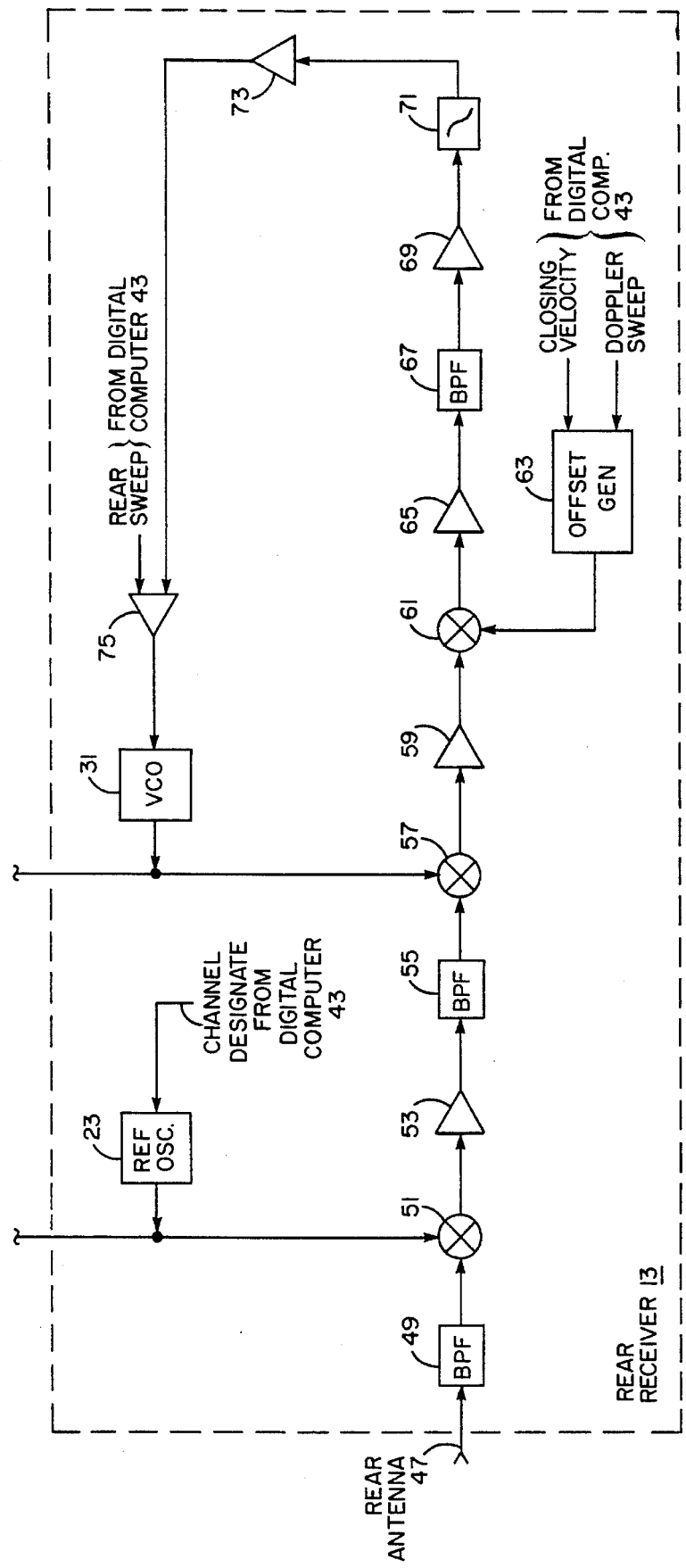

Referring now to FIGS. 1A and 1B, a semiactive guidance system according to this invention is shown to include a front receiver 11 and a rear receiver 13 for X-band signals. The front receiver 11 receives echo signals from a target (not shown) on an antenna 15 here a monopulse antenna. The signals on the antenna 15 are passed to a conventional monopulse arithmetic network 17 wherein monopulse sum and yaw error signals are formed. Such signals are passed through bandpass filters 19 a, 19b, 19c, respectively, prior to being downconverted to first I.F. signals at, say, 430 MHz. The downconversion is accomplished by heterodyning (in mixers 21a, 21b, 21c) an L.O. signal obtained from a multi-channel low noise reference oscillator 23 within the rear receiver 13 with the received X-band signals. The first I.F. signals from the mixers 21a, 21b, 21c are amplified by I.F. preamplifiers 25a, 25b, 25c, filtered by bandpass filters 27a, 27b, 27c, and then downconverted to a second I.F. frequency of, say, 31 MHz. The second downconversion is accomplished by heterodyning (in mixers 29a, 29b, 29c) an output signal from a wide band voltage controlled oscillator (VCO) 31 within the rear receiver 13 with the first I.F. signals. The second I.F. signals from the mixers 29a, 29b, 29c are amplified in amplifiers 33a, 33b, 33c, filtered in narrow band crystal filters 35a, 35b, 35c and then time-multiplexed into a single channel within a multiplexer 37 in response to timing signals provided by a digital computer 43, The output signals from the multiplexer 37 are passed to a conventional I.F. receiver 39 that performs, inter alias the functions of automatic gain control and quadrature detection. The in-phase (I) and quadrature phase (Q) output signals from the I.F. receiver 39 are digitized in analog-to-digital converters (not shown) to provide input signals to a Fast Fourier Transform (FFT) signal processor 41. As is known, the latter is effective to transform the time domain data from the front receiver 11 into frequency domain data. The data from the FFT signal processor are passed to the digital computer 43 in the form of discrete complex amplitudes representing the received spectrum over a given bandwidth. The digital computer 43 is effective to extract the target data and, upon detecting a target, to initiate target tracking (in a manner to be described in detail hereinbelow) and to derive guidance signals to effect a target intercept. The guidance signals are converted to equivalent commands for the missile control surfaces (not shown) in a conventional autopilot 45.

It will be appreciated that the elements of FIG. 1A following the front receiver 11 are not required for an understanding of the invention, but are included here to show a complete semiactive guidance system.

The rear receiver 13 receives a portion of the illuminator signal from an illuminator (not shown) on a rear antenna 47 after passing through a bandpass filter 49 The filtered signal from the rear antenna 47 is downconverted to a first I.F. signal by being heterodyned in a mixer 51 with the output signal from the multi-channel low noise reference oscillator 23. The first I.F. signal from the mixer 51 is amplified in a preamplifier 53, filtered in a bandpass filter 55 and then is downconverted to a second I.F. signal by being heterodyned in a mixer 57 with the output signal from the wide band VCO 31. The second I.F. output signal from the mixer 57 is amplified in an amplifier 59 prior to being downconverted to a third I.F. frequency by being heterodyned in a mixer 61 with the output signal from an offset generator 63. The third I.F. signal from the mixer 61 is amplified in an amplifier 65 prior to being passed through a bandpass filter 67, here a narrow band crystal filter with, say, a bandwidth of 10 KHz. The filtered third I.F. signal then is amplified in an amplifier 69 prior to being passed to a crystal discriminator 71 to produce an error signal whose amplitude and polarity is indicative of the difference between the third I.F. signal and the center frequency of the crystal discriminator 71. The error signal then, after being passed through an amplifier 73 and a summing amplifier 75, is applied to the wide band VCO 31.

It will be appreciated that the purpose of the summing amplifier 75 is to allow the application of a conventional "rear sweep" control signal to change the frequency of the wide band VCO 31 to attain a lock with the illuminator signal.

Digressing here now for a moment, it will be instructive to briefly review the operation of a typical embodiment of the invention. Thus, the frequency of the signal received by the monopulse antenna 15 may be expressed as:

$$f_I + f_{dM} + 2f_{dT} \tag{1}$$

where $f_I$ is the frequency of the radar illuminator (not shown), $f_{dM}$ is the Doppler frequency due to the missile velocity, and $f_{dT}$ is the Doppler frequency of the target. Because the Doppler velocity of the missile relative to the illuminator (not shown) is deemed to be negative, the frequency of the signal received by the rear antenna 47 may be expressed as:

$$f_I - f_{dM} \tag{2}$$

The first I.F. frequency, I.E., the frequency of the signals out of the first downconversion mixers 21a, 21b, 21c may be expressed as:

$$f_R - f_I - f_{dM} - 2f_{dT} \tag{3}$$

where $f_R$ is the frequency of the N-channel reference oscillator 23. Similarly, the first I.F. frequency the frequency of the output signal from the first downconversion mixer 51 may be expressed as:

$$f_R - f_I + f_{dM} \tag{4}$$

The frequency of the signal out of the wideband VCO 31 may be expressed as:

$$f_R - f_I - f_{dM} - 2f_{dT} - f \tag{5}$$

where f is the second I.F. frequency. The frequency out of the second downconversion mixer 57 in the rear receiver 13 may be expressed as:

$$f + 2f_{dM} + 2f_{dT} \tag{6}$$

As previously mentioned, the frequency of the offset generator 63 is centered at f. However, a frequency control signal representing closing velocity and a Doppler sweep signal are impressed on the offset generator 63 as shown. It will be appreciated by those of skill in the art that the Doppler frequency attributable to the closing velocity may be expressed as:

$$2f_{dM} + 2f_{dT} \tag{7}$$

and, consequently, the frequency of the output signal from the offset generator 63 may be expressed as:

$$f + 2f_{dM} + 2f_{dT} \tag{8}$$

Any frequency difference between the input signal to the discriminator 71 and the center frequency of that device is provided as a control signal of the proper polarity to force the wide band VCO 31 to track the Doppler frequency attributable to the missile-to-target closing velocity. As the center frequency of the wide band VCO 31 is changed to track the missile-to-target closing velocity (Doppler frequency), it is effective both to maintain frequency of the input signal to the discriminator 71 and to keep the output signals from the mixers 29a, 29b, 29c centered within the narrow band filters 35a, 35b, 35c.

Figure 2:
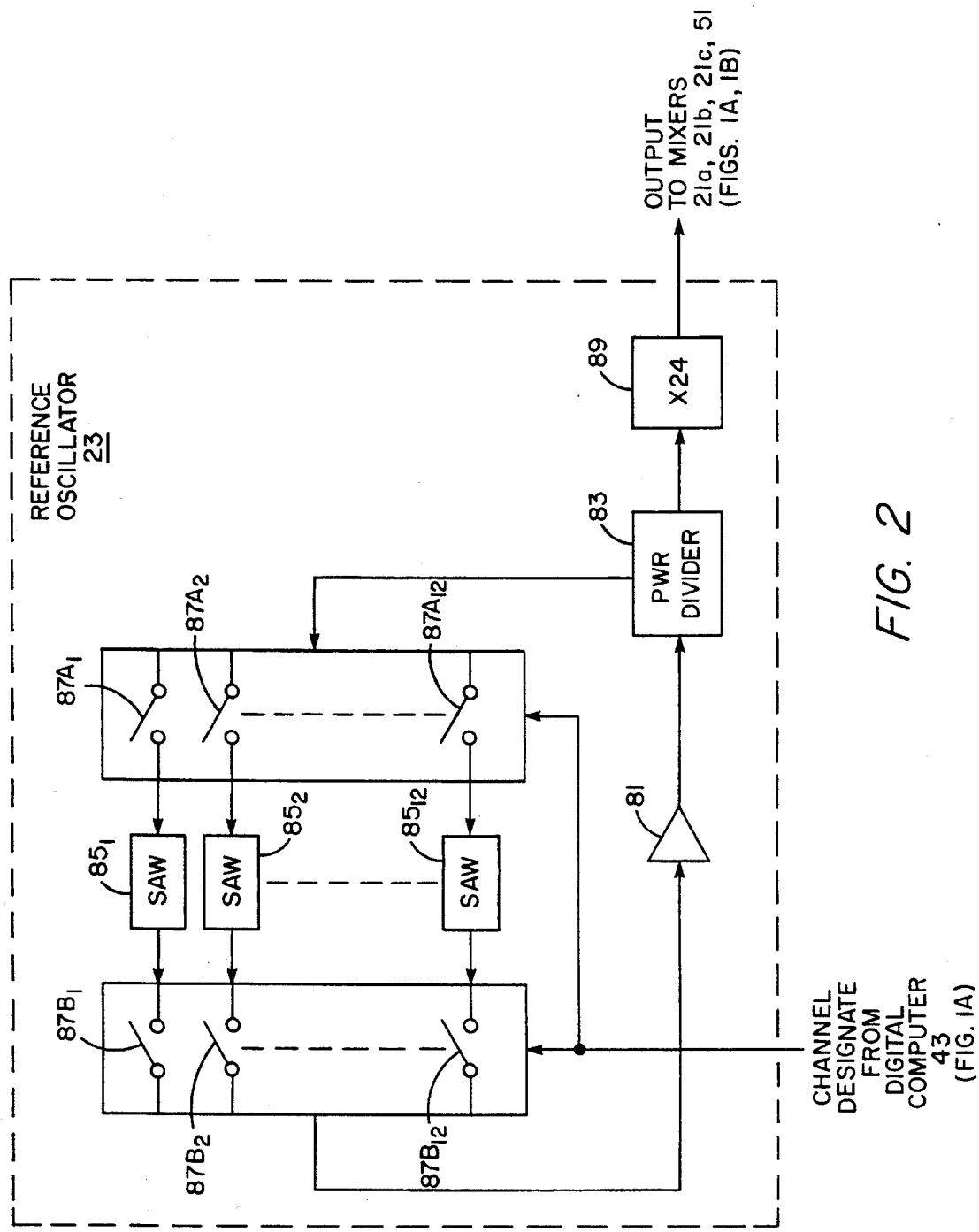
FIG. 2 is a simplified block diagram of the reference oscillator of FIG. 1B.

Referring now to FIG. 2, the low noise N channel reference oscillator 23 is shown to include an amplifier 81, a power divider 83, a plurality of known surface acoustic wave (SAW) line resonators $85_1, 85_2 \ldots 85_{12}$ and a plurality of single pole single throw switches $87A_1, 87B_1, 87A_2, 87B_2 \ldots 87A_{12}, 87B_{12}$. All of the foregoing elements here operate in the frequency range of 410 to 425 MHz. The desired output signal at X-band from the reference oscillator 23 is provided by multiplying (in a times 24 frequency .. multiplier 89) the signal out of the power divider 83. Each pair of switches having a common subnumeral, as, for example, switches $87A_1$ and $87B_1$ are switched in unison in response to the appropriate CHANNEL DESIGNATE signal provided by the digital computer 43 (FIG. 1A). Each of the SAW line resonators $85_1, 85_2 \ldots 85_{12}$ has a differential time delay of 8.5 microseconds and, therefore, the separation between modes of oscillation at X-band is 2.8 MHz. It should be appreciated that the frequency modulation (FM) noise performance of the reference oscillator 23 using the SAW line resonators is superior to that of an equivalent device utilizing a bank of bulk crystal oscillators followed by a frequency multiplier.

It should now be appreciated that the narrow band rear AFC loop (not numbered) is closed through the wide band VCO 31. Consequently, the latter must have a frequency agile bandwidth of greater than 20 MHz about a center frequency of 400 MHz. Closing the rear AFC loop at 400 MHz rather than at an X-band frequency as in prior art semiactive missile seekers obviates the need for an agile low noise (YIG discriminator controlled) X-band reference. It should be noted, however, that the noise requirements of the N-channel reference oscillator 23 and the wide band VCO 31 are equivalent to those of the prior art YIG degenerated local oscillator. However, because the N-channel reference oscillator 23 operates at a fixed frequency, and since the wide band VCO 31 operates at a frequency some 25 times lower than the X-band reference frequency, the noise requirements of both the N-channel reference oscillator 23 and the wide band VCO 31 are more readily achieved.

Having described a preferred embodiment of the invention, it will now be apparent to one of skill in the art that other embodiments incorporating its concept may be used. Thus, for example, the reference oscillator 23 could just as easily have been fabricated from six SAW line resonators with a 2-bit phase shifter in the feedback path between the switched SAW line resonators and the amplifier output. It is felt, therefore, that this invention should not be restricted to the disclosed embodiment, but rather should be limited only by the spirit and scope of the appended claims.

What is claimed is:

1. In a semiactive radar guidance system for a guided missile, such missile carrying a monopulse receiver to convert echo signals to tracking signals and a rear receiver responsive to signals coming directly from a radar transmitter to provide a local oscillator signal that is offset in frequency by a predetermined amount from the frequency of the signals from a radar transmitter, the improvement comprising:

(a) first downconversion means for providing, in response to the echo signals and a first local oscillator signal, first I.F. signals in the monopulse receiver and, also in response to signals coming directly from the radar transmitter and the first local oscillator signal, first I.F. signals in the rear receiver;

(b) second downconversion means, responsive to the first I.F. signals in the rear receiver and to a second local oscillator signal, for providing a second local oscillator signal to downconvert the first I.F. signals in the monopulse receiver to second I.F. signals; and (c) automatic frequency control means for maintaining a fixed offset of the second local oscillator signal from the frequency of the first I.F. signals input into the second downconversion means.

2. The improvement as in claim 1 wherein the first local oscillator signal is generated in an oscillator comprising:

(a) a plurality of SAW resonators, each one of such resonators producing a signal at a different frequency lower than the frequency transmitted by the radar transmitter;

(b) switching means for selecting the signal out of a desired one of the SAW resonators; and (c) multiplying means, responsive to the selected signal for multiplying such signal to produce the first local oscillator signal.

3. The improvement as in claim 2 wherein the automatic frequency control means comprises:

(a) a voltage-controlled oscillator for producing the second local oscillator signal; (b) means, responsive to the first I.F. signal in the rear receiver and to the second local oscillator signal, for producing a control signal for the voltage-controlled oscillator to maintain the offset frequency of the second local oscillator signal from the frequency of the first I.F. signal at a predetermined value.

4. The improvement as in claim 3 wherein the means of claim 3 comprises:

(a) means for producing an offset signal having a frequency differing from the frequency of the second I.F. signal by a predetermined amount;

(b) downconversion means, responsive to the offset signal and to the second I.F. signal, for producing a third I.F. signal;

(c) bandpass filter means, responsive to the third I.F. signal, for passing only the third I. F. signal; and (d) discriminator means for producing the control signal.

* * * * *